Oct. 14, 1958     H. V. ALLISON     2,855,733
ABRASIVE CUTTING WHEEL METHOD
Filed Dec. 28, 1956
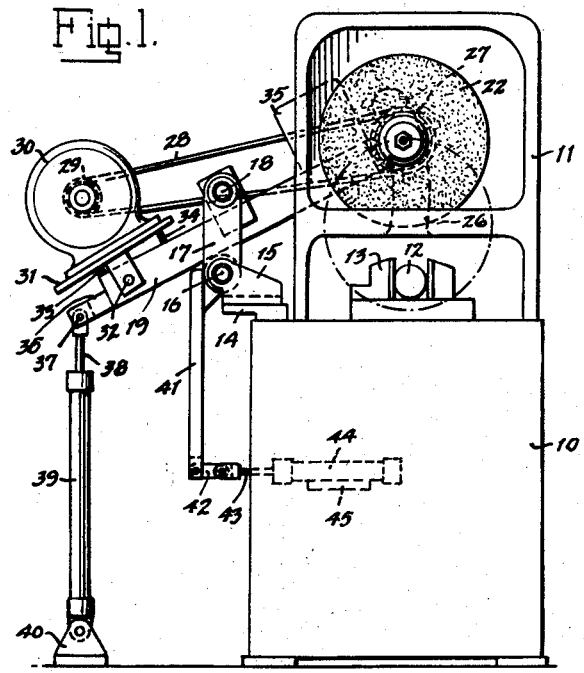
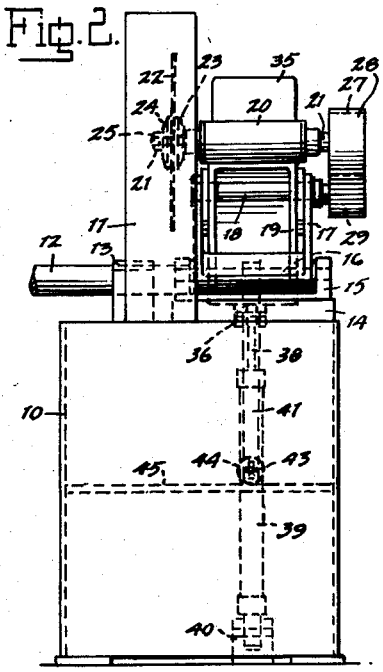
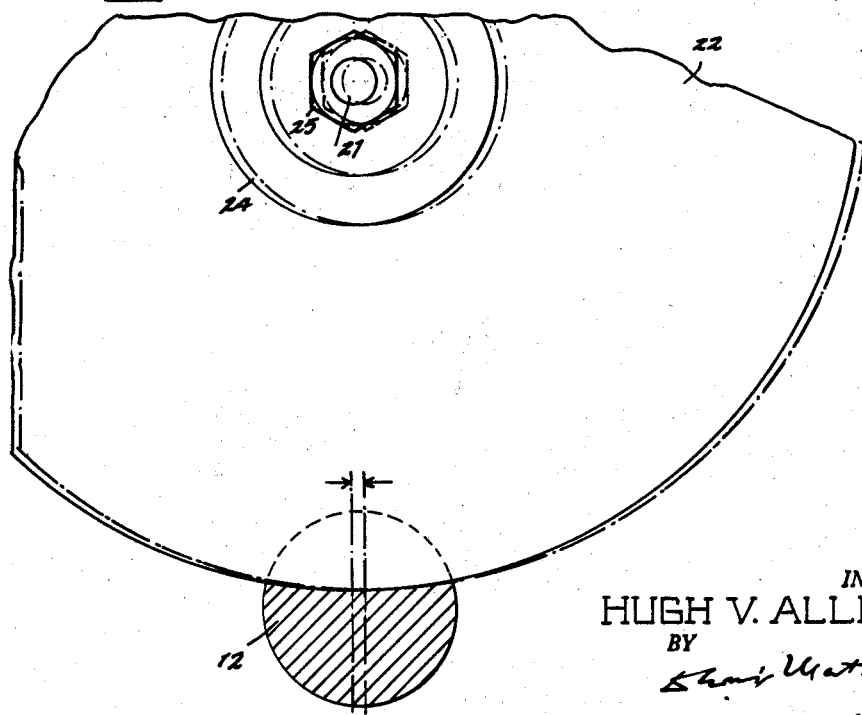
INVENTOR.
HUGH V. ALLISON
BY
ATTORNEY.

… … …

United States Patent Office 2,855,733
Patented Oct. 14, 1958

2,855,733

ABRASIVE CUTTING WHEEL METHOD

Hugh V. Allison, Fairfield, Conn., assignor to American Chain and Cable Company, Inc., Bridgeport, Conn., a corporation of New York Application December 28, 1956, Serial No. 631,118

2 Claims. (Cl. 51—281)

The present invention relates to an abrasive cutting method and has for an object to make possible the efficient rapid cutting of materials of varying degrees of hardness with one hard grade of abrasive cutting wheel consisting of suitable abrasive grains held in a bond such as resin, rubber or similar composition.

The practise heretofore has been to employ hard cutting wheels for soft material and small cross-sectional areas, and soft cutting wheels for hard materials and large cross-sectional areas. This has been necessary because the cutting surface of the wheel remains in constant engagement with the material as it is being cut, and thus causes a build-up of particles of the material being cut between the wheel surface and the cut surface of the work resulting in glazing and loss of cutting efficiency. In the case of cutting hard materials, a soft cutting wheel will allow for the rapid release of the built-up particles of the material being cut as well as the rapid release of the worn grains of the abrasive wheel, so that sharp grains are exposed to constantly present a fresh cutting medium. In the case of cutting soft materials, a hard cutting wheel will release the worn grains at a slower rate and thus makes for longer lift and more efficient cutting of such soft materials.

An object of the invention is to prevent the continued engagement for any appreciable period of the peripheral cutting surface of the wheel with the material being cut, and to this end it is proposed to impart rapid and short oscillations to the cutting wheel.

It has been found that by oscillating the wheel spindle at the rate of no less than 150 cycles per minute with an amplitude of about 1/16" to about 1/4", it becomes possible to cut both hard and soft materials with one hard grade of cutting wheel and to obtain good cutting efficiency with a higher cutting rate than was previously possible. Also a constant low motor load is obtained. Previously when cutting large sections intermittent overload was caused on the motor while the wheel was passing through the material, and this is especially true in the case of previous oscillating or reciprocating wheels having relatively slow speed back and forth movements of relatively large amplitude.

Other objects and advantages of the invention will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is a front elevation of a cutting machine according to the invention;

Fig. 2 is a side elevation; and

Fig. 3 is an enlarged diagrammatic view showing the amplitude of the oscillation imparted to a cutting wheel in engagement with work being cut.

Referring to the drawings, a suitable abrasive cutting machine for carrying out the method of the invention comprises a pedestal base 10 upon the upper side of which there is supported a wheel housing guard 11 in which the abrasive cutting wheel, presently to be more fully referred to, is movable into cutting engagement with the work, as, for instance, a cylindrical steel bar 12 to be cut, and which is suitably clamped by means of a vise 13 mounted upon the pedestal. Mounted upon the pedestal at the rearward side of the housing guard 11 there is provided a bracket 14 upon which an oscillator base 15 is mounted, and in which there is pivotally mounted upon an axle 16 an oscillating yoke frame 17 having side arms extending substantially vertically above the axle 16 and pivotally connected at their upper ends by means of a shaft 18 to a swing frame 19 provided at its forward end with a spindle bearing 20 in which the spindle 21 of the abrasive wheel 22 is journalled.

The abrasive wheel is mounted upon the inner end of the spindle in the conventional manner by means of clamping flanges 23 and 24 secured by a nut 25, the wheel being disposed within the housing 11 which is provided in its rearward wall with a slot opening 26 through which the spindle 21 moves during the cutting operation. Upon the outer end of the spindle there is secured a pulley 27 driven by a belt 28 from a pulley 29 of a motor 30 secured upon a base plate 31 adjustably mounted upon the rearward end of the swing frame by means of a shaft 32, the adjusted position of the motor adapted to be secured by adjustment screws 33 and 34 carried by the swing frame.

A counterweight 35 is mounted upon the forward end of the swing frame to substantially balance the weight of the motor, so that the swing frame may be operated with relative ease. A bracket 36 secured to the rearward end of the swing frame is pivotally connected by a pin 37 to the piston rod 38 of a hydraulic cylinder 39 pivotally mounted at its lower end in a bracket 40, operation of the hydraulic cylinder adapted to impart swinging movement to the swing frame to move the abrasive wheel from its raised position, as seen in full lines in Fig. 1, into cutting relation with the work, as shown by the dot-and-dash lines, the direction of movement of the wheel being being in an arc along a substantially vertical path. During this feeding movement the swing frame and the cutting wheel carried thereby have rapid, short oscillations imparted thereto, and for this purpose an arm 41 is fixedly secured to the oscillating frame 17 and is extended downwardly a substantial distance so that it provides a lever arm of greater length than the lever arm represented by the distance between the shafts 16 and 18. A leverage advantage is thus obtained whereby the shaft 18 is oscillated through a relatively short distance as the lower end of the arm 41 is oscillated through a relatively longer distance.

At the lower end of the arm 41 there is pivotally connected a link 42 to which there is pivotally connected the piston rod 43 of a horizontally disposed hydraulic cylinder 44 mounted upon a suitable base 45 within the pedestal 10, and which is of suitable type to impart rapid short oscillations to the arm 41 and in turn to the swing frame carried by the oscillating frame 17. While the hydraulic cylinder 39 is shown for imparting swinging movement to the swing frame and the hydraulic cylinder 44 is shown for imparting rapid oscillatory movement thereto, it will be understood that any suitable means may be provided for performing these functions.

In operation the work, as, for instance, the bar 12, is secured in the vise 13 and is cut by the rapidly rotating abrasive wheel as the latter moves downwardly. At the same time, rapid short oscillations are imparted to the wheel in a direction transverse to the downward movement of the wheel through operation of the hydraulic cylinder 44. While the cutting wheel may be of any suitable diameter and thickness within the normal cutting wheel range, it has been found that a hard abrasive wheel of relatively large diameter, for instance 16", of about $\frac{1}{8}$" thickness, and driven at a speed of about 15,000 peripheral feet per minute for dry cutting, and about 9,000 peripheral feet per minute for wet cutting, has high cutting efficiency in the rapid cutting of both hard and soft materials when oscillated at relatively high speed with a relatively small amplitude, for instance, $\frac{1}{16}$" to $\frac{1}{4}$". It has been found that the preferred range of oscillation is 200-300 cycles per minute, although cutting efficiency can be obtained at as low as 150 cycles per minute, and under suitably controlled conditions cutting efficiency may be obtained at an oscillation rate substantially above 300 cycles per minute.

What is claimed is:

1. The method of abrasive wheel cutting comprising feeding a rotating abrasive cutting wheel in cutting relation to a work piece and imparting rapid short oscillations to said wheel of an amplitude of about $\frac{1}{16}$ inch to about $\frac{1}{4}$ inch in the plane of its rotation simultaneously with said feeding movement and at an angle transverse to the direction of feed.

2. The method as defined in claim 1, wherein said oscillations are not less than approximately 150 cycles per minute.

References Cited in the file of this patent
UNITED STATES PATENTS

| | | |
|---|---|---|
| 2,651,888 | Comstock | Sept. 15, 1953 |
| 2,704,912 | Soderlund | Mar. 29, 1955 |
| 2,718,732 | Comstock | Sept. 27, 1955 |